(12) United States Patent
Chen et al.

(10) Patent No.: US 10,318,321 B2
(45) Date of Patent: Jun. 11, 2019

(54) VIRTUAL DESKTOP SYSTEM AND METHOD OF CONTROL

(71) Applicant: HONGFUJIN PRECISION ELECTRONICS (TIANJIN) CO., LTD., Tianjin (CN)

(72) Inventors: Xing-Huang Chen, New Taipei (TW); Cheng-Chen Chang Chian, New Taipei (TW); Chieh-Hang Shih, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 159 days.

(21) Appl. No.: 15/482,993

(22) Filed: Apr. 10, 2017

(65) Prior Publication Data
US 2018/0293083 A1  Oct. 11, 2018

(51) Int. Cl.
G06F 9/451 (2018.01)
G06F 9/455 (2018.01)
H04L 29/06 (2006.01)

(52) U.S. Cl.
CPC .......... *G06F 9/452* (2018.02); *G06F 9/45558* (2013.01); *H04L 63/083* (2013.01); *H04L 63/0876* (2013.01); *H04L 63/12* (2013.01); *G06F 2009/45595* (2013.01)

(58) Field of Classification Search
CPC ............... G06F 9/452; G06F 9/45558; G06F 2009/45595; H04L 63/12; H04L 63/083; H04L 63/0876
See application file for complete search history.

(56) References Cited

U.S. PATENT DOCUMENTS

| | | | |
|---|---|---|---|
| 8,635,351 B2 * | 1/2014 | Astete ................ | G06F 9/45533 709/229 |
| 2008/0084870 A1 * | 4/2008 | Taylor .................... | H04L 63/08 370/352 |
| 2009/0019367 A1 * | 1/2009 | Cavagnari .............. | G06F 21/62 715/716 |
| 2011/0119390 A1 * | 5/2011 | Leech ................. | H04L 12/4679 709/228 |

(Continued)

OTHER PUBLICATIONS

Tzi-cker et al., "Smartphone Virtualization", 2016, IEEE, pp. 141-150. (Year: 2016).*

*Primary Examiner* — Matthew Smithers
(74) *Attorney, Agent, or Firm* — ScienBiziP, P.C.

(57) ABSTRACT

A virtual desktop system includes a thin client, a virtual desktop managing device, a domain managing device, and a virtualization server. The virtualization server includes at least one virtual machine and virtual desktop. The thin client receives input from a user, and communicates with the virtual desktop managing device by network. The virtual desktop managing device communicates with the domain managing device and virtualization server by network. The domain managing device verifies a domain account of the user according to the inputted information and returns a verification or non-verification to the virtual desktop managing device. The virtual desktop managing device obtains an internet protocol (IP) address of the virtual machine from the virtualization server and returns such IP address to the thin client to enable log-in. A virtual desktop control method is also provided.

20 Claims, 4 Drawing Sheets

(56) References Cited

U.S. PATENT DOCUMENTS

| | | | |
|---|---|---|---|
| 2012/0096271 A1* | 4/2012 | Ramarathinam ... | H04L 63/0807 713/172 |
| 2012/0096461 A1* | 4/2012 | Goswami ............ | G06F 9/45558 718/1 |
| 2012/0179820 A1* | 7/2012 | Ringdahl .................. | G06F 8/63 709/225 |
| 2013/0246596 A1* | 9/2013 | Fujiwara ................. | H04L 41/00 709/223 |
| 2014/0373092 A1* | 12/2014 | Hussain .............. | H04L 63/0272 726/3 |
| 2015/0169206 A1* | 6/2015 | Balakrishnan ...... | G06F 3/04847 715/740 |
| 2016/0323104 A1* | 11/2016 | Mayers ................. | H04L 9/0894 |
| 2016/0350148 A1* | 12/2016 | Kitagawa ............. | H04L 67/306 |
| 2016/0381031 A1* | 12/2016 | McMichael, IV .... | H04L 63/102 726/6 |
| 2017/0199872 A1* | 7/2017 | Krasadakis ....... | G06F 17/30023 |
| 2018/0069829 A1* | 3/2018 | Ramasamy ......... | H04L 61/2015 |
| 2018/0109625 A1* | 4/2018 | Jayaraman ............ | H04L 67/141 |
| 2018/0131722 A1* | 5/2018 | Burrell .................... | H04L 63/20 |
| 2018/0191856 A1* | 7/2018 | Chang ................. | H04L 61/1511 |

\* cited by examiner

VIRTUAL DESKTOP SYSTEM AND METHOD OF CONTROL

FIELD

The subject matter herein generally relates to virtualization servers and virtual desktops.

BACKGROUND

A virtualization server can provide virtual desktops for a user. The user can use the virtual desktop for mobile working.

BRIEF DESCRIPTION OF THE DRAWINGS

Implementations of the present disclosure will now be described, by way of example only, with reference to the attached figures.

DETAILED DESCRIPTION

Figure 1:
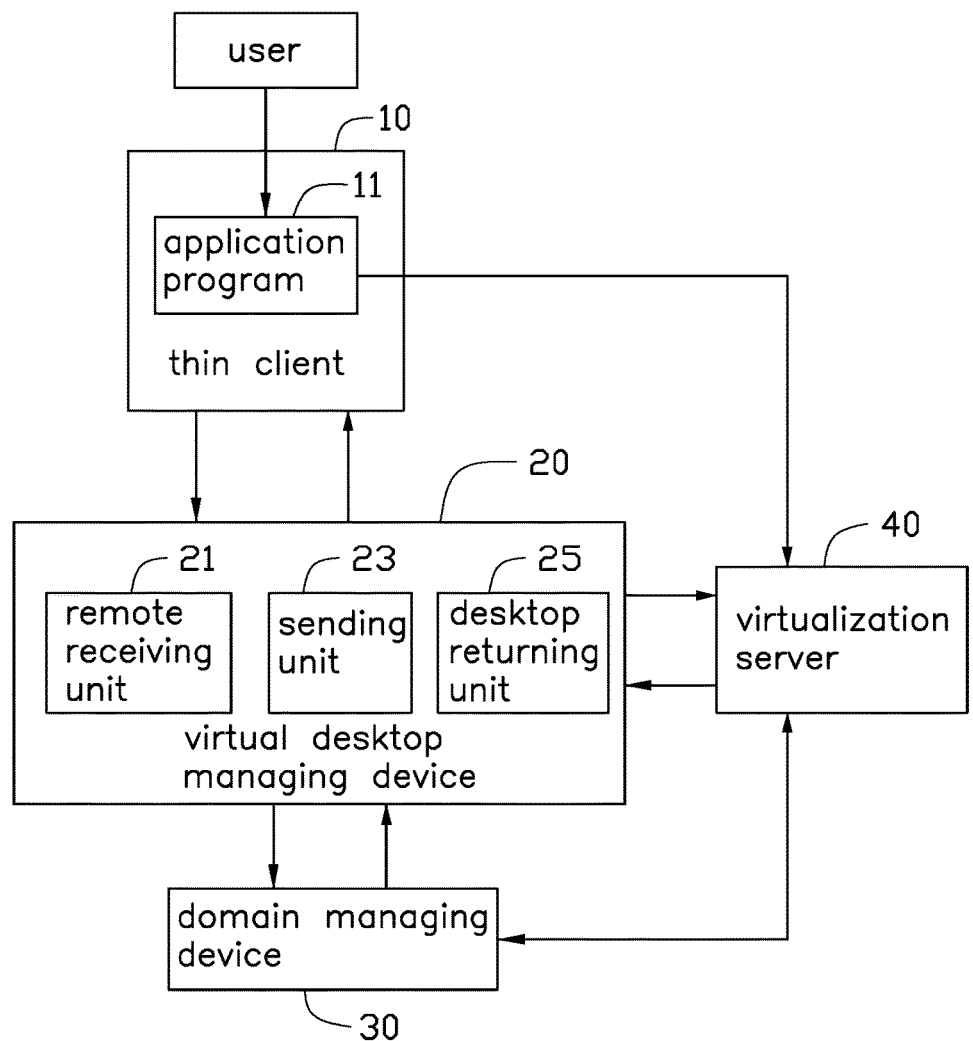
FIG. 1 is a block diagram of one exemplary embodiment of a virtual desktop system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

The present disclosure is described in relation to a virtual desktop system and a method of controlling same. An Android terminal can log into an operating system of the virtual desktop system.

FIG. 1 illustrates an exemplary embodiment of a virtual desktop system. The virtual desktop system comprises a thin client 10, a virtual desktop managing device 20, a domain managing device 30, and a virtualization server 40.

The thin client 10 is configured to receive input information from a user. The thin client 10 is configured to communicate with the virtual desktop managing device 20 by network communication, thereby enabling the user to transmit the input information to the virtual desktop managing device 20 through the thin client 10. The virtual desktop managing device 20 is configured to communicate with the domain managing device 30 by the network communication.

The virtual desktop managing device 20 is further configured to communicate with the virtualization server 40 by the network communication.

In at least exemplary embodiment, the thin client 10 is an Android terminal. The thin client 10 can be a mobile phone with an Android operating system or can be a panel computer with an Android operating system.

The thin client 10 comprises an application program 11. The thin client 10 can communicate with the virtual desktop managing device 20 by the network communication after the application program 11 runs.

In at least one exemplary embodiment, the virtual desktop managing device 20 can be a server with a Windows operating system or a Linux operating system. Virtualization server 40 is a server with a Windows operating system. The virtual desktop managing device 20 comprises a remote receiving unit 21, a sending unit 23, and a desktop returning unit 25.

The application program 11 of thin client 10 is configured to communicate with the remote receiving unit 21 by remote connection.

The virtualization server 40 comprises at least one virtual machine. The virtualization server 40 is configured to provide a virtual desktop pool. The virtual desktop pool is configured to provide at least one virtual desktop.

In one exemplary embodiment, the virtual desktop pool comprises a privately-owned desktop pool and a publicly-owned desktop pool. The privately-owned desktop pool comprises at least one privately-owned virtual desktop. The publicly-owned desktop pool comprises at least one publicly-owned virtual desktop. When the thin client 10 is connected to third or fourth generation of mobile phone mobile communication technology standards (3G or 4G) or wireless fidelity (WI-FI) network, the user can log into one privately-owned virtual desktop or publicly-owned virtual desktop of the virtualization server 40, by the user inputting information into the thin client 10. In the exemplary embodiment, the input information comprises a domain account. The domain account comprises an account number, a password, and a domain name in relation to the user.

The privately-owned desktop pool is a proprietary desktop pool for the user. A desktop state and data of each privately-owned virtual desktop remain unchanged. Each privately-owned virtual desktop is provided for one user. The privately-owned desktop pool is created by the virtualization server 40 according to an account number and a password registered by the user.

A manager who manages the domain managing device 30, or the user who uses the privately-owned virtual desktop, can lock out the privately-owned virtual desktop. The manager can configure various boot strategies for each privately-owned virtual desktop according to the actual needs of the user, through the domain managing device 30. Each virtual machine configuration of the privately-owned virtual desktop can be different from others. The user can update the software installed in the virtual machine of the privately-owned desktop pool. The privately-owned virtual desktop is dedicated to one domain account. When the privately-owned virtual desktop is disconnected from the user, the disconnected privately-owned virtual desktop remains unchanged. The privately-owned virtual desktop can resume normal use after the disconnected privately-owned virtual desktop is reconnected by the same domain account.

The publicly-owned virtual desktop is a temporary virtual desktop. The publicly-owned virtual desktop is temporarily used by a user. The publicly-owned virtual desktop is created by the virtualization server 40 according to the actual needs of the user. The publicly-owned virtual desktop is recycled by the virtualization server 40 when the publicly-owned virtual desktop is not being used by the user. The user can obtain a new publicly-owned virtual desktop every time when the publicly-owned virtual desktop is connected to by the domain account. The publicly-owned desktop pool supports various recycling strategies. Each virtual machine configuration of the publicly-owned desktop pool configuration is same.

The user cannot update the software installed in the virtual machine of the publicly-owned desktop pool. The publicly-owned virtual desktop being connected to every time by the same domain account will be different. When the publicly-owned virtual desktop is disconnected from the user after a time, (for example, after a predetermined time), the disconnected virtual machine will be recycled. The virtualization server 40 can set the number of unused virtual machines of the publicly-owned desktop pool according to actual needs. When another user connects to the virtual machine of the publicly-owned desktop pool, the number of the unused virtual machines of the publicly-owned desktop pool is less than before, thus the virtualization server 40 automatically creates virtual machines to maintain the number of the unused virtual machines of the publicly-owned desktop pool.

The domain managing device 30 is an active directory (AD) domain managing server, and a Windows operating system is installed. The domain managing device 30 stores the account number, the password, and the domain name in relation to the user. The domain managing device 30 is configured to verify the domain account of the user. The domain managing device 30 is also configured to return a verification to the virtual desktop managing device 20.

Specifically, the thin client 10 is configured to send a first request to the virtual desktop managing device 20 to verify the domain account. The virtual desktop managing device 20 is configured to send a second request to the domain managing device 30 to verify the domain account after receiving the first request. The domain managing device 30 is configured to verify the domain account after receiving the second request and return a verification to the virtual desktop managing device 20 after verifying the domain account.

The virtualization server 40 is configured to assign one virtual desktop to the virtual desktop managing device 20 according to the verification (in the exemplary embodiment, the verification is normal). The desktop returning unit 25 of the virtual desktop managing device 20 is configured to provide a virtual desktop to the user. For example, when the user requesting the privately-owned desktop pool is verified as normal, the virtualization server 40 assigns one privately-owned virtual desktop to the virtual desktop managing device 20, thus the desktop returning unit 25 returns the assigned privately-owned virtual desktop to the thin client 10. When the user requesting the publicly-owned desktop pool is verified as normal, the virtualization server 40 assigns one publicly-owned virtual desktop to the virtual desktop managing device 20, thus the desktop returning unit 25 assigns a publicly-owned virtual desktop to the thin client 10.

In detail, when the user selects the privately-owned desktop pool through the thin client 10, the virtualization server 40 assigns one privately-owned virtual desktop to the virtual desktop managing device 20. Thereby, the virtual desktop managing device 20 returns an internet protocol (IP) address of the virtual machine of the privately-owned virtual desktop received from the virtualization server 40 to the thin client 10, thus the thin client 10 can log into one privately-owned virtual desktop according to the IP address and the inputted information. Thus the user can log into the privately-owned virtual desktop.

When the user selects publicly-owned desktop pool through the thin client 10, the virtualization server 40 assigns a publicly-owned virtual desktop to the virtual desktop managing device 20. Thereby, the virtual desktop managing device 20 returns an IP address of the virtual machine of the publicly-owned virtual desktop received from the virtualization server 40 to the thin client 10, thus the thin client 10 can log into one publicly-owned virtual desktop according to the IP address and the inputted information, thereby enabling the user to log into the publicly-owned virtual desktop.

Figure 2:
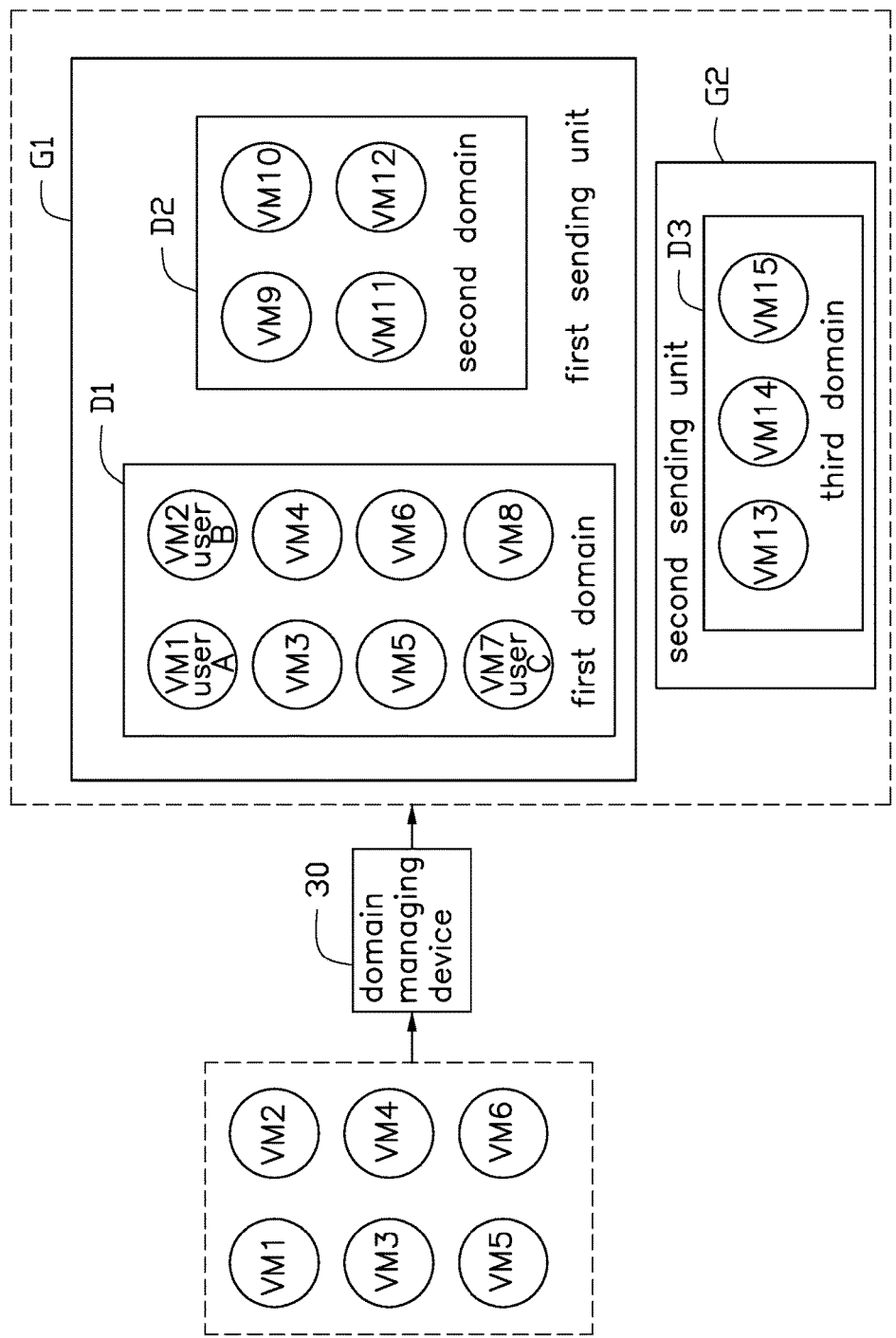
FIG. 2 is a diagram of a domain managing device of the system of FIG. 1 which assigns virtual machines to a domain.

The domain managing device 30 is configured to assign the virtual machine to one domain. FIG. 2 illustrates that in one exemplary embodiment, there are six virtual machines to be assigned to one domain. These virtual machines are virtual machine VM1, a virtual machine VM2, a virtual machine VM3, a virtual machine VM4, a virtual machine VM5, and a virtual machine VM6. The domain managing device 30 assigns the six virtual machines VM1-VM6 to a first domain D1 of a first group G1. The virtual machines having being assigned to one domain further comprises four virtual machines VM9-VM12 located in a second domain D2 of the first group G1, and three virtual machines VM13-VM15 located in a third domain D3 of a second group G2. The virtual machine VM1 having being assigned to the first domain D1 is assigned to a user A. The virtual machine VM2 having being assigned to the first domain D1 is assigned to a user B. The virtual machine VM7 having being assigned to the first domain D1 is assigned to a user C.

Figure 3:
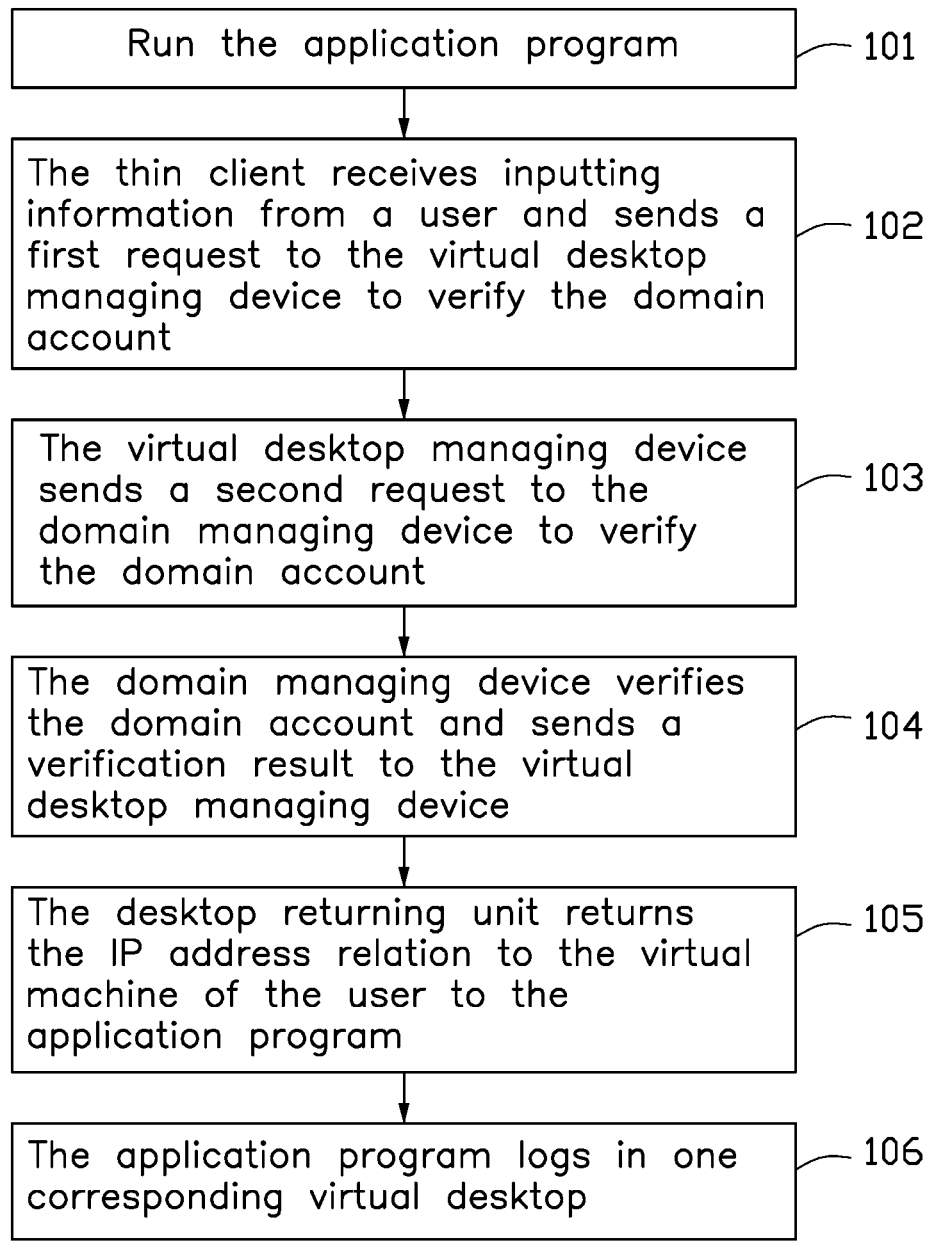
FIG. 3 is a flowchart of one exemplary embodiment of a virtual desktop control method.

FIG. 3 illustrates a flowchart of a method in accordance with an example embodiment. A virtual desktop control method is provided by way of example, as there are a variety of ways to carry out the method. The method described below can be carried out using the configurations illustrated in FIGS. 1-2, for example, and various elements of these figures are referenced in explaining the virtual desktop control method. The illustrated order of blocks is by example only and the order of the blocks can change. Additional blocks may be added or fewer blocks may be utilized without departing from this disclosure. The virtual desktop control method can begin at block 101.

At block101, run the application program 11. Specifically, the user can start the application program 11 to run the application program 11.

At block 102, the thin client 10 receives input information from a user and sends a first request to the virtual desktop managing device 20.

In the exemplary embodiment, the input information comprises an account number, a password, and a domain name. Specifically, after the user runs the application program 11 of the thin client 10, the user inputs an account number and a password, and inputs or selects one domain name, then the application program 11 can be connected to the virtual desktop managing device 20.

In detail, if the domain name is firstly input to an operating interface of the application program 11, the user must input the domain name manually. After the domain name is firstly input by the user, the thin client 10 stores the input domain name, thereby enabling the user to select the domain name if the user uses the thin client 10 at the next time.

Specifically, in the exemplary embodiment, the account number, password, and domain name are verified to be correct, thus the thin client 10 sends the account number, password, and domain name to the virtual desktop managing device 20 to send the first request to the virtual desktop managing device 20.

At block103, the virtual desktop managing device 20 sends a second request to the domain managing device 30 to verify the domain account.

Specifically, after the remote receiving unit 21 of the virtual desktop managing device 20 receives the account number, the password, and the domain name sent by the application program 11 of the thin client 10, the sending unit 23 of the virtual desktop managing device 20 sends the received account number, password, and domain name to the domain managing device 30, sends the second request to the domain managing device 30 to verify the domain account.

At block 104, the domain managing device 30 verifies the domain account and sends a verification to the virtual desktop managing device 20.

Specifically, the domain managing device 30 verifies the domain account of the user to obtain a normal verification or a failed verification, according to the received account number, password, and domain name. In the exemplary embodiment, the verification is normal.

At block 105, the desktop returning unit 25 returns the IP address in relation to the virtual machine of the user to the application program 11.

Specifically, after the virtual desktop managing device 20 obtains that the verification is normal, the virtualization server 40 assigns one virtual desktop to the virtual desktop managing device 20, thereby enabling the virtual desktop managing device 20 to return one requested virtual desktop pool to the user, for example, when the user requests one privately-owned desktop pool, the virtualization server 40 assigns one privately-owned virtual desktop to the virtual desktop managing device 20, the desktop returning unit 25 returns the IP address in relation to the virtual machine of the privately-owned virtual desktop to the application program 11; when the user requests one publicly-owned desktop pool, the virtualization server 40 assigns one publicly-owned virtual desktop to the virtual desktop managing device 20, the desktop returning unit 25 returns the IP address in relation to the virtual machine of the publicly-owned virtual desktop to the application program 11.

At block 106, the application program 11 logs into one corresponding virtual desktop.

Specifically, the application program 11 logs into one corresponding virtual desktop according to the IP address of the virtual machine and according to the account number, password, and domain name of the user. In detail, when the application program 11 receives the IP address of the virtual machine of the privately-owned virtual desktop, the application program 11 logs into one privately-owned virtual desktop according to the received input information; when the application program 11 receives the IP address of the virtual machine of the publicly-owned virtual desktop, the application program 11 logs in one publicly-owned virtual desktop according to the received input information.

Figure 4:
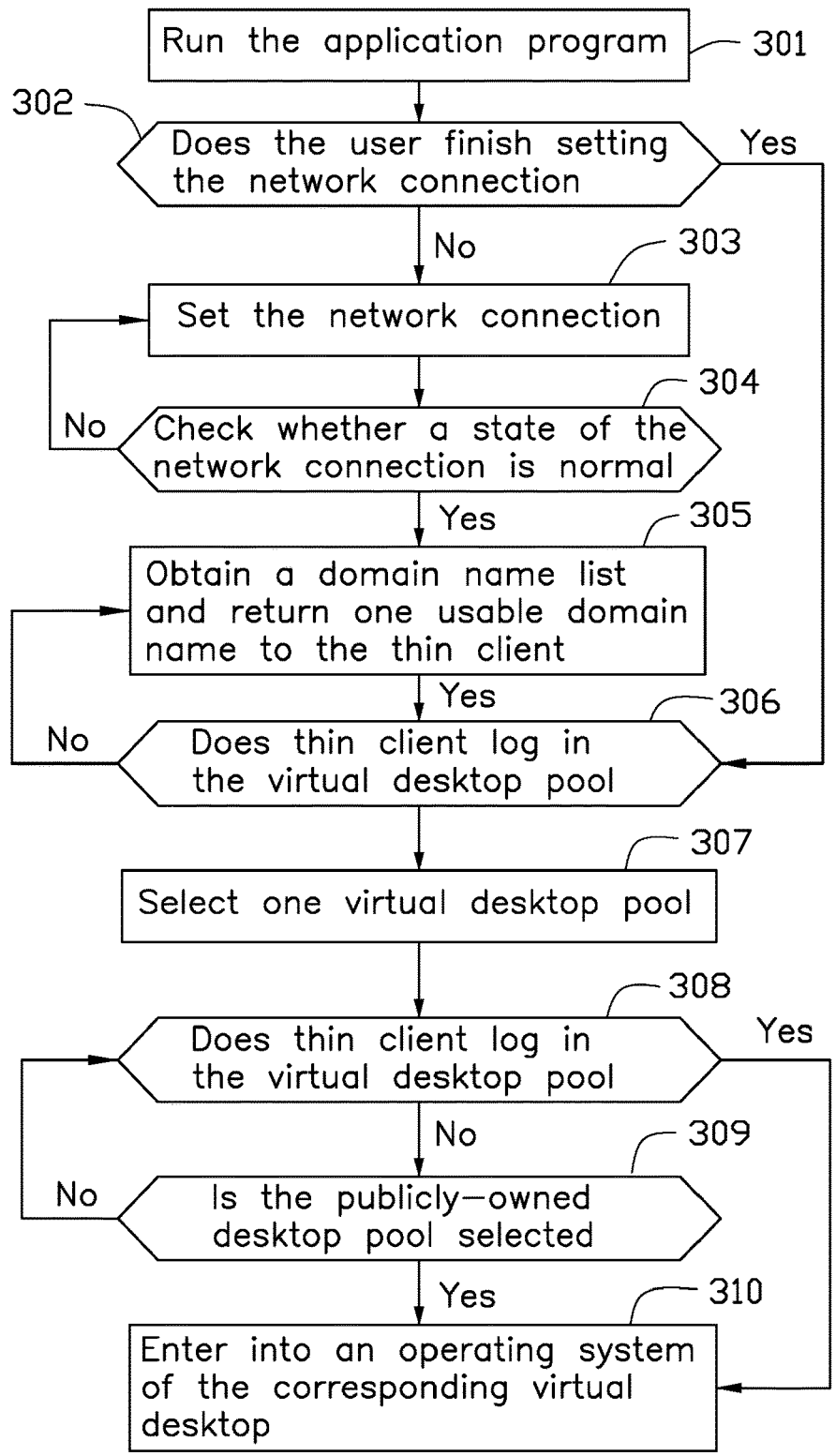
FIG. 4 is a flowchart of one exemplary embodiment of an operating method for a user using a virtual desktop.

FIG. 4 illustrates a flowchart of an operating method for the user using the virtual desktop in accordance with an example embodiment. The operating method is provided by way of example, as there are a variety of ways to carry out the method. The operating method described below can be carried out using the configurations illustrated in FIGS. 1-3, for example, and various elements of these figures are referenced in explaining the flowchart. The illustrated order of blocks is by example only and the order of the blocks can change. Additional blocks may be added or fewer blocks may be utilized without departing from this disclosure. The operating method can begin at block 301.

At block 301, run the application program 11. Specifically, after the user runs the application program 11, the user can input information (such as the account number, the password, and the domain name).

At block 302, does the user finish setting the network connection. If yes, the method goes to block 306; if no, the method goes to block 303. Specifically, the virtual desktop system determines whether finishes setting the network connection after the user inputs the account number, password, and domain name.

At block 303, set the network connection. Specifically, the user can set the network connection after the virtual desktop system receives the input information from the user.

At block 304, check whether a state of the network connection is normal. If yes, the method goes to block 305; if no, the method goes to block 303. Specifically, the virtual desktop system receives triggered instruction from the user to set the network connection.

At block 305, obtain a domain name list and return one usable domain name to the thin client 10.

Specifically, the domain name list comprises at least one domain name, the virtual desktop system obtains the domain name list and returns one usable domain name of domain name list to the thin client 10, thereby enabling the user to select one corresponding domain name through the thin client 10.

At block 306, whether thin client 10 logs into the virtual desktop pool. If yes, the method goes to block 307; if no, the method goes to block 306. Specifically, the virtual desktop system determines whether the account number, password, and domain name are correct, then logs into a virtual desktop pool selecting interface when determining the account number, password, and domain name are correct, thus the user can select one virtual desktop pool on the virtual desktop pool selecting interface.

At block 307, select one virtual desktop pool. Specifically, the user can select one privately-owned desktop pool or one publicly-owned desktop pool.

At block 308, whether the privately-owned desktop pool is selected. If yes, the method goes to block 310; if no, the method goes to block 309.

At block 309, whether the publicly-owned desktop pool is selected. If yes, the method goes to block 310; if no, the method goes to block 308.

At block 310, enter into an operating system of the corresponding virtual desktop.

Specifically, when the user selects the privately-owned desktop pool through the thin client 10, the user can log into one corresponding operating system of one privately-owned virtual desktop through the thin client 10; when the user selects the publicly-owned desktop pool through the thin client 10, the user can log into one corresponding operating system of one publicly-owned virtual desktop through the thin client 10.

In the virtual desktop system and virtual desktop control method, the user can select one privately-owned virtual desktop or one publicly-owned virtual desktop to log into one operating system of the privately-owned virtual desktop or one operating system of the publicly-owned virtual desktop through the thin client, thus mobile work is provide to the user conveniently.

The exemplary embodiments shown and described above are only examples. Many details are often found in the art such as the other features of a virtual desktop system and a virtual desktop control method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A virtual desktop system comprising:
 a virtual desktop managing device;
 a thin client configured to:
  receive input information from a user; and
  communicate with the virtual desktop managing device by network communication;
  send the received input information to the virtual desktop managing device;
 a domain managing device;
 a virtualization server comprising:
  a plurality of virtual machines;
  a privately-owned desktop pool comprising at least one privately-owned virtual desktop, each privately-owned virtual desktop being for one user; and
  a publicly-owned desktop pool comprising at least one publicly-owned virtual desktop, the publicly-owned virtual desktop being for temporary use;
 wherein the virtual desktop managing device is configured to communicate with the domain managing device to send the received input information to the domain managing device;
 wherein the domain managing device is configured to:
  verify a domain account of the user according to the received input information; and
  return a verification to the virtual desktop managing device;
 wherein the virtual desktop managing device is further configured to:
  obtain an internet protocol (IP) address of one virtual machine corresponding to one privately-owned virtual desktop from the virtualization server by communicating with the virtualization server, according to verification when the user selects the privately-owned desktop pool through the thin client, and obtain an internet protocol (IP) address of one virtual machine corresponding to one publicly-owned virtual desktop from the virtualization server, according to verification when the user selects the publicly-owned desktop pool through the thin client; and
  return the IP address of the virtual machine to the thin client according to the verification;
 wherein the thin client is configured to log into the privately-owned virtual desktop or the publicly-owned virtual desktop according to the IP address of the virtual machine and the received input information.

2. The virtual desktop system of claim 1, wherein the thin client comprises an application program, the thin client is configured to communicate with the virtual desktop managing device by the network communication after the application program runs, and the user can log into one corresponding virtual desktop through the application program.

3. The virtual desktop system of claim 2, wherein the virtual desktop managing device comprises a remote receiving unit, the remote receiving unit is configured to communicate with the application program by the network communication after the application program runs.

4. The virtual desktop system of claim 3, wherein the virtual desktop managing device further comprises a desktop returning unit, the desktop returning unit is configured to return the IP address of the virtual machine to the application program according to the verification.

5. The virtual desktop system of claim 1, wherein the thin client is a terminal with an Android operating system.

6. The virtual desktop system of claim 5, wherein the thin client can be a mobile phone with an Android operating system or be a panel computer Android system with Android operating system.

7. The virtual desktop system of claim 1, wherein the input information comprises an account number, a password, and a domain name in relation to the user.

8. The virtual desktop system of claim 1, wherein the publicly-owned virtual desktop being connected to by the same domain account is different each time.

9. The virtual desktop system of claim 8, wherein when the publicly-owned virtual desktop is disconnected from the user after a predetermined time, the disconnected virtual machine is recycled.

10. The system of claim 1, wherein the verification is normal.

11. A virtual desktop control method used in a virtual desktop system, the virtual desktop system comprises a thin client, a virtual desktop managing device, a domain managing device, and a virtualization server comprising a plurality of virtual machines, a privately-owned desktop pool comprising at least one privately-owned virtual desktop and a publicly-owned desktop pool comprising at least one publicly-owned virtual desktop, each privately-owned virtual desktop being for one user; the publicly-owned virtual desktop being for temporary use, the virtual desktop control method comprising:
 the thin client receives input information from a user;
 the domain managing device verifies a domain account of the user according to the received input information;
 the domain managing device returns a verification to the virtual desktop managing device;
 the virtual desktop managing device obtains an internet protocol (IP) address of one virtual machine corresponding to one privately-owned virtual desktop from the virtualization server according to verification when the user selects the privately-owned desktop pool through the thin client, and obtain an internet protocol (IP) address of one virtual machine corresponding to one publicly-owned virtual desktop from the virtualization server, according to verification when the user selects the publicly-owned desktop pool through the thin client;
 the virtual desktop managing device returns the IP address of the virtual machine to the thin client; and
 the thin client logs in the privately-owned virtual desktop or the publicly-owned virtual desktop according to the IP address of the virtual machine and the received input information.

12. The virtual desktop control method of claim 11, further comprising a step of running an application program of the thin client before the step of the thin client receiving the input information from the user.

13. The virtual desktop control method of claim 11, further comprising a step of the thin client sending a first request to the virtual desktop managing device to verify the domain account after the step of the thin client receiving the input information from the user.

14. The virtual desktop control method of claim 13, further comprising a step of the virtual desktop managing device sending a second request to the domain managing device to verify the domain account between the step of the thin client sending the first request to the virtual desktop managing device and the step of the domain managing device verifying the domain account of the user.

15. The virtual desktop control method of claim 11, wherein the publicly-owned virtual desktop being connected to by the same domain account is different each time.

16. The virtual desktop control method of claim 15, wherein when the publicly-owned virtual desktop is disconnected from the user after a predetermined time, the disconnected virtual machine is recycled.

17. The virtual desktop control method of claim 16, wherein the input information further comprises a domain name, when the domain name is firstly input to an operating interface of the application program, the user inputs the domain name manually.

18. The virtual desktop control method of claim 17, wherein after the domain name is firstly input by the user, the thin client stores the inputting domain name, thereby the user can select the domain name if the user uses the thin client at the next time.

19. The virtual desktop control method of claim 11, wherein the virtual desktop managing device comprises a remote receiving unit, the remote receiving unit communicates with the application program by the network communication after the step of the application program running.

20. The virtual desktop control method of claim 11, wherein the thin client is an Android terminal.

* * * * *